United States Patent [19]

Harting

[11] Patent Number: 4,821,155
[45] Date of Patent: Apr. 11, 1989

[54] COMPACT ACTUATOR FOR A CONCEALED HEADLAMP ASSEMBLY

[75] Inventor: Thomas E. Harting, Alexandria, Ind.

[73] Assignee: General Motors Corporation, Detroit, Mich.

[21] Appl. No.: 210,541

[22] Filed: Jun. 23, 1988

[51] Int. Cl.⁴ ................................................. B60Q 1/06
[52] U.S. Cl. ........................................ 362/65; 362/70; 362/272; 362/428
[58] Field of Search ................ 362/65, 66, 70, 61, 362/67, 269, 272, 427, 428

[56] References Cited

U.S. PATENT DOCUMENTS

| | | | |
|---|---|---|---|
| 3,532,872 | 10/1970 | Hall | 362/65 |
| 4,246,628 | 1/1981 | Ikemizu et al. | 362/66 |
| 4,282,561 | 8/1981 | Yano | 362/65 |
| 4,380,789 | 4/1983 | Craig | 362/66 |
| 4,471,410 | 9/1984 | Nakano | 362/70 |
| 4,516,191 | 5/1985 | Moriyama et al. | 362/65 |
| 4,602,319 | 7/1986 | Moriyama et al. | 362/66 |

FOREIGN PATENT DOCUMENTS

| | | | |
|---|---|---|---|
| 58-93638 | 6/1983 | Japan | 362/65 |
| 59-195437 | 11/1984 | Japan | 362/65 |
| 60-99734 | 6/1985 | Japan | 362/65 |

Primary Examiner—Ira S. Lazarus
Assistant Examiner—Richard R. Cole
Attorney, Agent, or Firm—Patrick M. Griffin

[57] ABSTRACT

An actuator for a concealed headlamp has a linkage and support assembly including an intermediate carrier bracket and a pair of connecting links that allow the headlamp housing to be effectively rotated about a pivot axis located outside of the limited volume available for the actuator.

2 Claims, 3 Drawing Sheets

COMPACT ACTUATOR FOR A CONCEALED HEADLAMP ASSEMBLY This invention relates to concealed headlamp actuators in general, and specifically to an improved, compact actuator that allows for better control of the raised position of the headlamp.

BACKGROUND OF THE INVENTION

A common type of vehicle concealed headlamp actuator may be seen in U.S. Pat. No. 4,380,789 to Craig, assigned to the assignee of the subject invention. A headlamp housing with a cover fixed to the top is pivoted at its back end to the vehicle body and at its front to the upper end of a single link. The lower end of the link is pivoted to a drive crank fixed to a motor drive shaft. In the retracted position, the headlamp housing cover closes an opening in the vehicle body hood, concealing the headlamp. When the motor is activated, the motor drive shaft rotates the drive crank to drive the link up and rotate the headlamp housing about its pivot to the vehicle body, raising the cover and exposing the headlamp. As disclosed in Craig, the final raised position of the cover is tilted significantly back from the horizontal. In some designs, it may desired to have a raised cover position that is more flat or horizontal. This could present a problem with the conventional type of actuator just described, because there is generally a limited volume below the hood in which the actuator may work.

Referring to FIG. 6, an example of the prior art actuator just described is indicated generally at 10. Actuator 10 is incorporated in a vehicle that has a vehicle body with a front panel 12, generally a hood, in which there is a headlamp opening 14. The vehicle body also includes an upper tie bar, radiator support or other body member 16 that represents an obstruction that limits the volume available beneath hood 12 within which an actuator can be mounted. A headlamp housing 18 has a cover 20 on top that is sized to match opening 14. Actuator 10 includes a motor 22 fixed by bracket 24 to the vehicle body. A motor drive shaft 26 has a short drive crank 28 secured thereto. A link 30 is pivoted at its lower end to drive crank 28 and at its upper end to the front of headlamp housing 18. The rear of headlamp housing 18 is pivoted to the vehicle body at a single, fixed pivot 32, the location of which will be further described below. As motor 22 turns drive shaft 26 and drives crank 28 up or down, the link 30 rotates the headlamp housing 18 up and down between retracted and raised positions. Positive stops, not separately illustrated, act to stop the actuator 10 at the desired positions. The preferred retracted position closes opening 14, as shown in dotted lines, with cover 20 conforming to the general contour of hood 12. The typical raised orientation for cover 20, as in the patent noted above, is tilted back significant, forming a V pattern with hood 12, also shown in dotted lines. However, it may be desired for styling, aerodynamic and other reasons to provide a raised cover position that is more nearly horizontal. With an actuator like actuator 10, with its fixed pivot 32, this can only be done by moving pivot 32 back beyond body member 16, out of the limited volume available. Generally, this will be totally impractical, and at best, not a preferred solution.

SUMMARY OF THE INVENTION

The invention provides an actuator that can attain the desired final, raised orientation of the cover while still containing all of the actuator structure compactly with the limited volume available. Instead of a single, fixed pivot, which gives a single degree of freedom, the invention provides two degrees of freedom and consequently improved control of the cover raised position.

A similarly sized and contoured vehicle body hood, hood headlamp opening, headlamp housing, and headlamp housing cover are used as with the conventional actuator described above. The volume available below the hood for the actuator is similarly limited. Rather than being pivoted directly to the vehicle body, however, the headlamp housing is pivoted at its back end to the back end of a carrier bracket. The carrier bracket is pivoted at its front end to the vehicle. Two connecting links are pivoted at their lower ends to two different locations on a drive crank secured to the motor drive shaft. The upper end of the first link is pivoted to the carrier bracket at a location spaced from the carrier bracket-vehicle body pivot. The upper end of the second link is pivoted to the headlamp housing at a location spaced from the carrier bracket-headlamp housing pivot.

As the motor turns the drive crank, the two connecting links are simultaneously pushed up. In turn, the carrier bracket is rotated up relative the vehicle body as the headlamp housing is rotated up relative to the carrier bracket, giving two degrees of freedom. The net effect is that the headlamp housing rotates about an imaginary pivot located at a point outside of the limited volume. Thus, the final position of the cover can be much more flexibly controlled, even though all the actuator physical structure is located inside the limited volume that is practically available. An additional advantage of the preferred embodiment disclosed is that the various pivot points of the connecting links to the drive crank below and to the carrier bracket above are predetermined so as to be in a straight line, or near to it, relative to the axis of the motor drive shaft at both the retracted and raised positions. This gives a deceleration of the actuator as it approaches both the retracted and the raised positions, which creates less impact on the positive stops.

It is, therefore, a general object of the invention to provide a compact actuator for a concealed headlamp assembly that provides better control of the raised position while still working within the limited volume available for the actuator.

It is another object of the invention to provide such an actuator having a carrier bracket pivoted at its back end to the headlamp housing and at its front end to the vehicle body, and with a pair of connecting links pivoted at their lower ends to two different locations on a motor shaft drive crank and at their upper ends to the carrier bracket and the headlamp housing respectively, so that turning the drive crank raises the carrier bracket about its pivot with the vehicle and simultaneously raises the headlamp housing about its pivot on the carrier bracket, thereby raising the headlamp housing by rotating it about an imaginary, net effect pivot located outside the limited volume.

It is yet another object of the invention to provide such an actuator in which the orientation of the pivot points of the connecting links to the drive crank and to the headlamp housing and carrier bracket are generally aligned in the raised and retracted positions so as to provide for deceleration of the actuator near the raised and retracted positions.

DESCRIPTION OF THE DRAWINGS

These and other objects and features of the invention will appear from the following written description, and from the drawings, in which.

Figure 1:
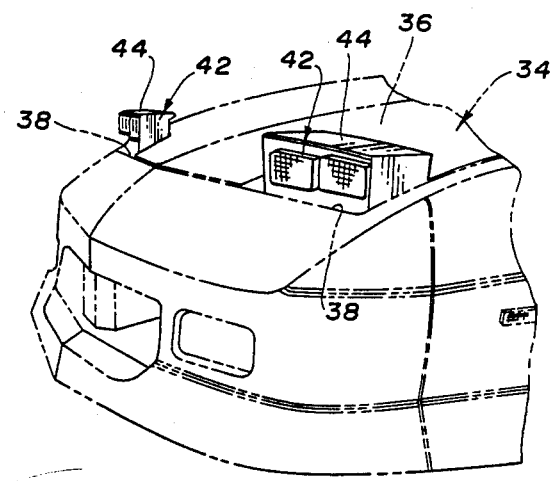
FIG. 1 is a perspective view of the front of a vehicle showing headlamp covers moved by the actuator of the invention to the raised position.
Figure 3:
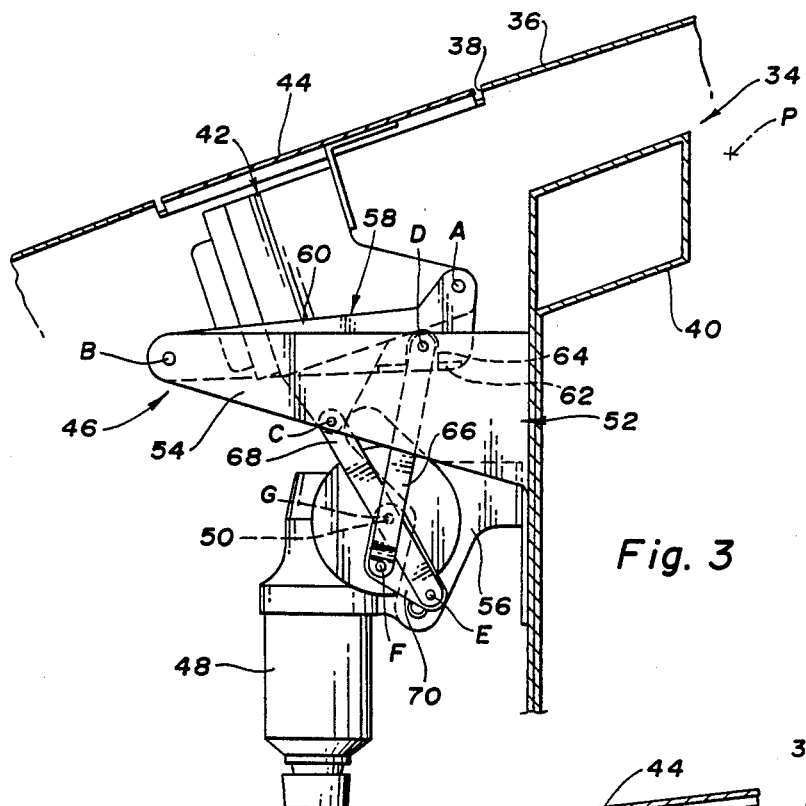
FIG. 3 shows the retracted or lowered position of the actuator and cover.

Referring first to FIGS. 1 and 3, a vehicle has a body designated generally at 34 which has a sloped hood or other front panel 36 with a headlamp opening 38. An obstruction such as an upper tie bar 40 or other member creates a limited volume below opening 38, which is all that is practically available in which to mount an actuator. A generally box shaped headlamp housing 42 has a cover 44 fixed to the top thereof. In a retracted position, cover 44 fills opening 38 and conforms to the slope of hood 36. It will be understood that hood 36, opening 38, body member 40, headlamp housing 42 and cover 44 have the same, or nearly the same, size and orientation as the corresponding structures already described in FIG. 6, for ease of direct comparison. While the retracted position of cover 44 is conventional, it is desired to give it a raised position that is more nearly horizontal, as seen in FIG. 1, rather than the convention, steeply backwardly sloped raised orientation.

Figure 2:
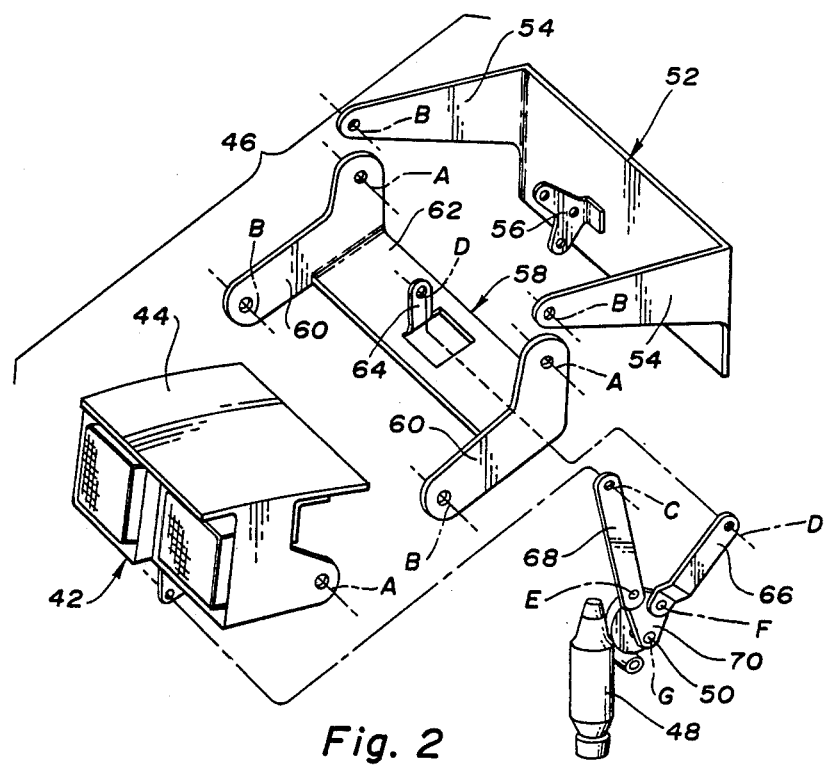
FIG. 2 is an exploded perspective view of a preferred embodiment of an actuator of the invention.

Referring next to FIGS. 2 and 3, the actuator of the invention, a preferred embodiment of which is designated generally at 46, has a conventional motor 48 and drive shaft 50, similar to motor 22 and drive shaft 26. The linkage of the actuator 46 is different, however. A stamped sheet metal body bracket indicated generally at 52 has a pair of spaced side wings 54 and a center flange 56. A stamped sheet metal carrier bracket indicated generally at 58 has a pair of generally L shaped, spaced sides 60 and a base 62. The base 62 is cut out near the center and a short tab 64 is bent up from the edge of the cutout. Body bracket 52 is secured to vehicle body member 40, and motor 48 is secured to body bracket center flange 56, midway between the side wings 54. The carrier bracket sides 60 fit closely within the body bracket side wings 54. The sides of the headlamp housing 42, in turn, fit closely between the carrier bracket sides 60. Headlamp housing 42 is not pivoted directly to the vehicle body 34. Instead, the sides of the headlamp housing 42 are pinned near the back of housing 42 between and within the upper ends of the sides 60 of carrier bracket 58, which acts like a shelf beneath housing 42 to securely support it on both sides. The lower ends of the carrier bracket sides 60 are pinned between the ends of the body bracket side wings 54, which securely supports the carrier bracket 58 on both sides to vehicle body 34. The net result is that the headlamp housing 42 is securely supported on vehicle body 34. The pinning of housing 42 to carrier bracket 58 defines a pivot axis A, and the pinning of carrier bracket 58 to body bracket 52 defines a pivot axis B. While headlamp housing 42 cannot pivot directly relative to vehicle body 34, it can pivot relative to carrier bracket 58 about axis A, while carrier bracket 58 can pivot directly relative to vehicle body 34, about axis B. In general, pivot axis A is located as close as possible to the obstruction represented by body member 40, while pivot axis B is located as close as possible to the lower edge of headlamp opening 38, so as to take maximum advantage of the limited volume available below opening 38.

Referring next to FIG. 3, a pair of connecting links, a first link 66 and second link 68, are used to actually move the carrier bracket 58 and headlamp housing 42 respectively. A generally triangular drive crank 70 is fixed at one corner of the triangle to motor drive shaft 50 and turns about the axis of shaft 50, designated G. First link 66 is pinned at its lower end to another corner of drive crank 70 to define a pivot axis F at approximately the 7 o'clock point and at its upper end to carrier bracket tab 64 to define a pivot axis D. Second link 66 is pinned at its lower end to the remaining corner of drive crank 70 to define a pivot axis E spaced from the pivot axis F, specifically at approximately the 5 o'clock point, and is pivoted at its upper end to the front center portion of headlamp housing 42 to define a pivot axis C. Because of the central location of motor 48, the upper ends of the connecting links 66 and 68 are pivoted to the approximate centers of the carrier bracket 58 and the headlamp housing 42 respectively, giving the box shaped headlamp housing 42 and bracket 58 a well balanced lateral support and resistance to twisting. It will be noted that pivot axis D is spaced from pivot axis B, so as to have a lever arm with respect thereto, just as pivot axis C is spaced from pivot axis A. The fact that the pivot axes A and B are spaced apart as far as possible within the limited volume allows the respective pivot axes C and D to have greater lever arms relative to A and B respectively. Still, the actuator 46 is suitably compact in that all of its structure is located inside the limited available volume. It should also be noted from FIG. 3 that the lengths of the links 66 and 68 and the relative locations where they are pinned to the drive crank 70, carrier bracket 58 and headlamp housing 42 are chosen so that, when the cover 44 is in the retracted position, they form an X pattern, although not a symmetrical X, with the turning axis G at the center of the X. Consequently, the axes C, G and E are aligned, as are the axes D, G and F.

Figure 4:
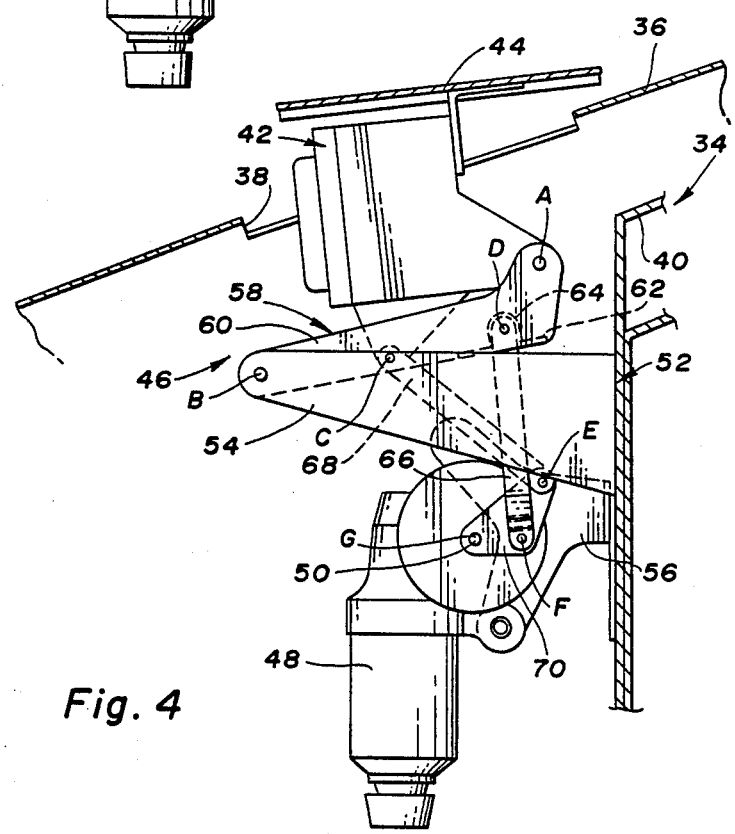
FIG. 4 shows an intermediate position.

Referring next to FIGS. 3 and 4, as motor 48 begins to turn drive crank 70 up, counterclockwise in this case, the two links 66 and 68 are moved up simultaneously. Consequently, first link 66 rotates the carrier bracket 58 up relative to the vehicle body 34 about the pivot axis B as link 68 rotates the headlamp housing 42 up relative to the carrier bracket 58 about the pivot axis A. The link 66 clears carrier bracket 58 since it passes through the relieved area next to tab 64, and the front edge of carrier bracket base 62 is cut back enough to clear the other link 68. The net result is that headlamp housing 42 is rotated up, but not about a fixed, direct pivot with only one degree of freedom. Instead, housing 42 rotates relative to vehicle body 34 in a series of infinitesimally small rotations about a moving point. The net effect, however, may be more simply described as a rotation about an imaginary pivot with a axis at P, shown in FIG. 3. which is located well behind body member 40 and outside of the limited volume available for the physical structure of actuator 46.

Figures 5, 6:
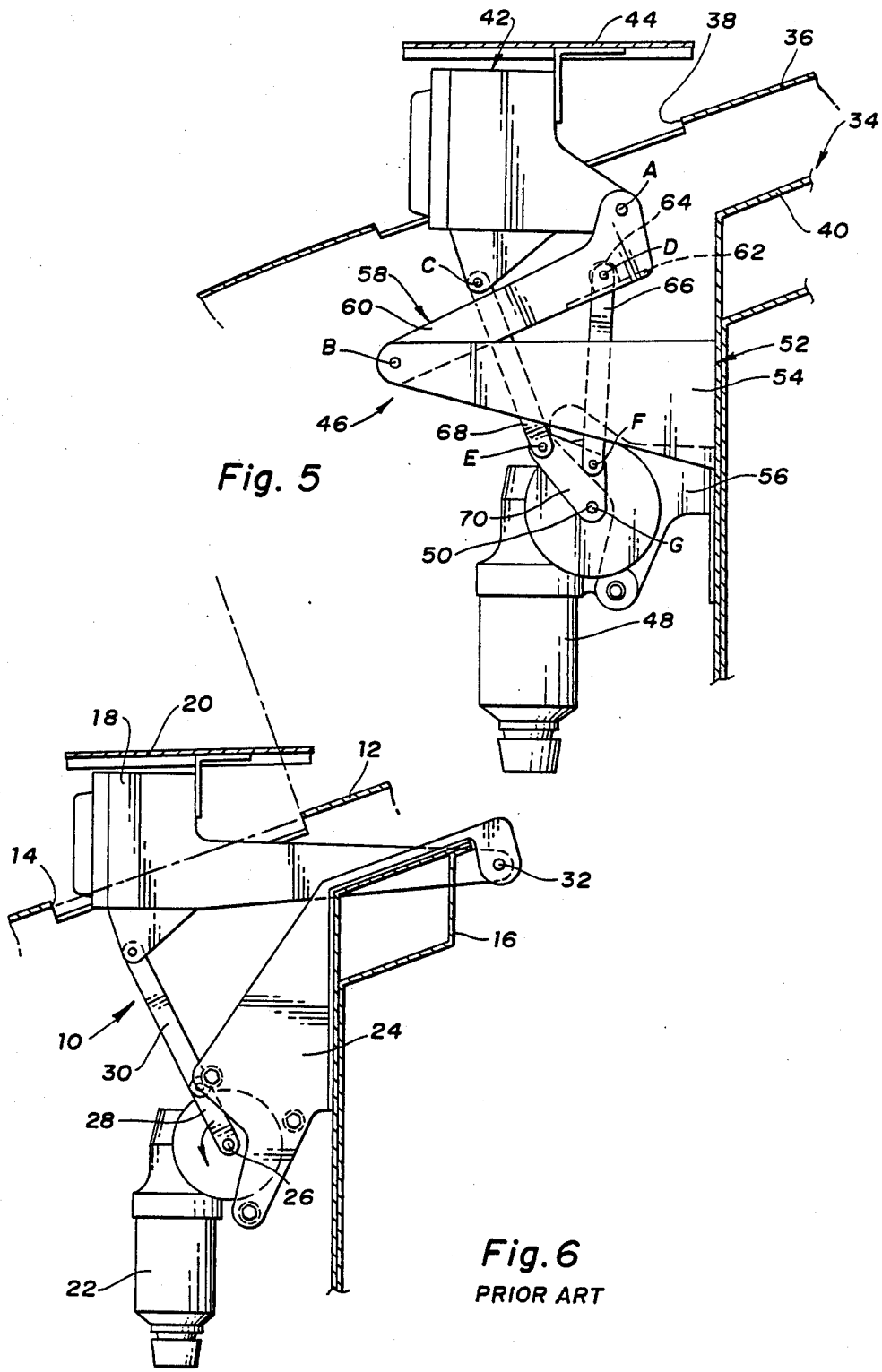
FIG. 5 shows the actuator and cover in the final or raised position.
FIG. 6 is the prior art actuator described above.

Referring next to FIGS. 3, 5 and 6, drive crank 70 continues to turn until a positive stop is engaged when cover 44 is at the FIG. 5 position. Reversing motor 48 will return the actuator 46 and cover 44 to the FIG. 3 retracted position. It will be noted in FIG. 3 that the imaginary pivot P happens to correspond to the fixed pivot 32 in FIG. 6. So, the result achieved by actuator 46 is to raise cover 44 to a nearly horizontal final position, just as the conventional actuator in FIG. 6 would have. The actuator 46 provides a greatly improved design flexibility, with its two degrees of freedom. By changing the lengths of the links 66 and 68, and the relative locations of the various pivot axes, several different locations of the pivot point P and consequently different raised orientations of the cover 44 may be achieved, all while working only within the limited volume available. It will also be noted in FIG. 5 that, at the raised position, the axes G, F and D are aligned, and that the axes G, E and C are nearly aligned, just as at the retracted position. The various axes of the actuator linkage move toward alignment as the limit positions of the actuator 46 are approached during retraction or raising. This alignment of axes serves to decelerates the linkage before the positive stops are hit, reducing impact, and also provides a toggle locking effect, especially useful in maintaining the cover raised position.

Variations of the preferred embodiment may be made. The alignment of the various axes at the two end positions is not necessary to the basic raising and retracting action, but does provide a very useful advantage with no additional structure. It would also be possible to design for the various pivot axes of the links 66 and 68 and the axis of drive shaft 70 to align at just the retracted or raised position. In the preferred embodiment, for example, the axes are more nearly aligned in the retracted than in the raised position. The drive crank 70 could be two separate drive cranks, which would act just like one crank. A much narrower headlamp housing 42 might need support on only one side, eliminating the need for the two spaced body bracket side wigs 54 and the shelf-like carrier bracket 58 in order to give sufficient lateral support to the headlamp housing 42. Most headlamp housings will have a significant width, however, especially those with two side by side lamps, so the particular embodiment shown for bracket 58 nested within the two sides of bracket 52 and the central location of the connecting links 66 and 68 is particularly useful in providing well balance lateral support. Therefore, it will be understood that the invention is not intended to be limited to just the preferred embodiment disclosed.

The embodiments of the invention in which an exclusive property or privilege is claimed are defined as follows:

What is claimed:

1. An actuator for a concealed headlamp assembly for a vehicle having a vehicle body with a front panel having a headlamp opening therein and a limited volume available below said opening to contain said actuator, comprising,
   a headlamp housing sized to fit within said limited volume and having an upper cover sized to close said front panel opening when said actuator is in a retracted position,
   a carrier bracket sized to fit within said limited volume and pivoted at one end to said headlamp housing and at the other end to said vehicle body,
   a motor fixed to said vehicle within said limited volume and having a drive shaft to which a drive crank is fixed,
   a first connecting link pivoted at a lower end to said drive crank and at an upper end to said carrier bracket,
   a second connecting link pivoted at a lower end to said drive crank at a location spaced from said first link lower end and at an upper end to said headlamp housing,
   whereby, when said motor drive shaft rotates said drive crank up from said retracted position, said first connecting link rotates said carrier bracket relative to said vehicle body as said second connecting link simultaneously rotates said headlamp housing relative to said carrier bracket, the net result of which is to raise said cover by rotating said headlamp housing about an imaginary pivot located outside of said limited volume, thereby allowing better control of the final raised position of said cover.

2. An actuator for a concealed headlamp assembly for a vehicle having a vehicle body with a front panel having a headlamp opening therein and a limited volume available below said opening to contain said actuator, comprising,
   a headlamp housing sized to fit within said limited volume and having an upper cover sized to close said front panel opening when said actuator is in a retracted position,
   a carrier bracket sized to fit within said limited volume and pivoted about an axis at one end to said headlamp housing and at the other end to said vehicle body,
   a reversing motor fixed to said vehicle within said limited volume and having a drive shaft defining a turning axis to which a drive crank is fixed,
   a first connecting link pivoted about an axis at a lower end to said drive crank and at an upper end to said carrier bracket, said first link length and pivot axis locations being chosen such that, in said retracted position, said upper and lower end pivot axes and said drive shaft turning axis are substantially aligned,
   a second connecting link pivoted about an axis at a lower end to said drive crank at a location spaced from said first link lower end and at an upper end to said haadlamp housing, said second link length and pivot axis locations also being chosen such that, in said retracted position, said upper and lower end pivot axes and said drive shaft turning axis are substantially aligned,
   whereby, when said motor drive shaft rotates said drive crank up from said retracted position first connecting link rotates said carrier bracket relative to said vehicle body as said second connecting link simultaneously rotates said headlamp housing relative to said carrier bracket, the net result of which is to raise said cover by rotating said headlamp housing about an imaginary pivot located outside of said limited volume, thereby allowing better control of the final raised position of said cover, and when said motor reverses to retract said cover, said actuator will decelerate as said drive shaft turning axis and respective connecting link pivot axes move into alignment.

* * * * *